US009228816B2

(12) United States Patent
Grau

(10) Patent No.: US 9,228,816 B2
(45) Date of Patent: Jan. 5, 2016

(54) METHOD OF DETERMINING A COMMON COORDINATE SYSTEM FOR AN ARTICULATED ARM COORDINATE MEASUREMENT MACHINE AND A SCANNER

(71) Applicant: FARO Technologies, Inc., Lake Mary, FL (US)

(72) Inventor: Markus Grau, Korntal-Muenchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 22 days.

(21) Appl. No.: 14/209,301

(22) Filed: Mar. 13, 2014

(65) Prior Publication Data

US 2014/0268108 A1    Sep. 18, 2014

Related U.S. Application Data

(60) Provisional application No. 61/786,713, filed on Mar. 15, 2013.

(51) Int. Cl.
| | |
|---|---|
| *G01N 11/14* | (2006.01) |
| *G01B 5/008* | (2006.01) |
| *G01B 11/14* | (2006.01) |
| *G01B 21/04* | (2006.01) |
| *G01B 11/25* | (2006.01) |

(52) U.S. Cl.
CPC ............... *G01B 5/008* (2013.01); *G01B 11/14* (2013.01); *G01B 11/25* (2013.01); *G01B 11/2504* (2013.01); *G01B 21/042* (2013.01)

(58) Field of Classification Search
CPC .......... G01B 11/2518; G01B 1125/22; G01B 11/002; G01B 5/008; G01B 5/20; H04N 13/0275
USPC .............. 356/601–623; 702/150, 152; 33/502
See application file for complete search history.

(56) References Cited

U.S. PATENT DOCUMENTS

| | | | | |
|---|---|---|---|---|
| 5,402,582 | A | * | 4/1995 | Raab ............................... 33/503 |
| 7,256,899 | B1 | * | 8/2007 | Faul et al. ..................... 356/623 |

(Continued)

OTHER PUBLICATIONS

"DLP-Based Structured Light 3D Imaging Technologies and Applications" by J. Geng; Proceedings of SPIE, vol. 7932. Published Feb. 11, 2011, 15 pages.

(Continued)

*Primary Examiner* — Hoa Pham
(74) *Attorney, Agent, or Firm* — Cantor Colburn LLP

(57) ABSTRACT

A method of determining a mathematical transformation to place three-dimensional (3D) coordinates of points measured by an articulated arm coordinate measurement machine (AACMM) and 3D points measured by a scanner in a common coordinate system is provided. The method including providing the 3D scanner and the AACMM having a probe. The scanner and AACMM each have a local frame of reference. Three non-collinear targets are measured with the probe and then with the scanner. 3D probe reference coordinates and 3D scanner reference coordinates are determined based on the measurement of the targets by the AACMM and scanner. The mathematical transformation is determined based at least in part on the 3D probe reference coordinates and the 3D scanner reference coordinates, the mathematical transformation characterized at least in part by a collection of parameters.

15 Claims, 15 Drawing Sheets

(56) References Cited

U.S. PATENT DOCUMENTS

| | | | |
|---|---|---|---|
| 8,001,697 B2* | 8/2011 | Danielson et al. | 33/503 |
| 8,533,937 B1 | 9/2013 | Wang et al. | |
| 2011/0170534 A1 | 7/2011 | York | |
| 2011/0173827 A1* | 7/2011 | Bailey et al. | 33/503 |
| 2014/0028805 A1 | 1/2014 | Tohme | |
| 2014/0168380 A1* | 6/2014 | Heidemann et al. | 348/47 |
| 2015/0075018 A1* | 3/2015 | Bridges et al. | 33/503 |
| 2015/0153146 A1* | 6/2015 | Ferrari et al. | G01B 5/008 |
| 2015/0229907 A1* | 8/2015 | Bridges | G01B 21/047 348/46 |

OTHER PUBLICATIONS

V. Carbone et al: Combination of a Vision System and a Coordinate Measuring Machine for the Reverse Engineering of Freeform Surfaces, The International Journal of Advanced Manufacturing Technology, vol. 17, No. 4, Jan. 26, 2001, pp. 263-271, XP055126634, ISSN: 0268-3768, figures 1-8.

International Search report of the International Application No. PCT/US2013/027047 mailed Jul. 17, 2014.

Feng Li et al: Integrated Tactile-Optical Coordinate System for the Reverse Engineering of Complex Geometry, Proceedings of the 37th International Matador Conference, Nov. 8, 2012, pp. 41-44.

Licheng Wang et al: Measurement Error Compensation Using Data Fusion Technique for Laser Scanher on AACMMs, Nov. 10, 2010, Intelligent Robotics and Applications, Springer Berlin Heidelberg, Berlin, Heidelberg, pp. 576-586, XP019156156, ISBN: 978-3-642-16586-3; Sections 1-3.1; figures 1-4; tables 1,2.

Feng Li et al: A practical coordinate unification method for integrated tactile-optical measuring system, Optics and Lasers in Engineering, vol. 55, Apr. 1, 2014, pp. 189-196, XP055126944, ISSN: 0143-8166, the whole document.

Jerzy Sladek et al: The hybrid contact-optical coordinate measuring system, Measurement, vol. 44, No. 3, Mar. 1, 2011, pp. 503-510, XP055047404, ISSN: 0263-2241, the whole document.

Written Opinion of the International Searching Authority for International Application No. PCT/US2014/027047 mailed Jul. 17, 2014.

* cited by examiner

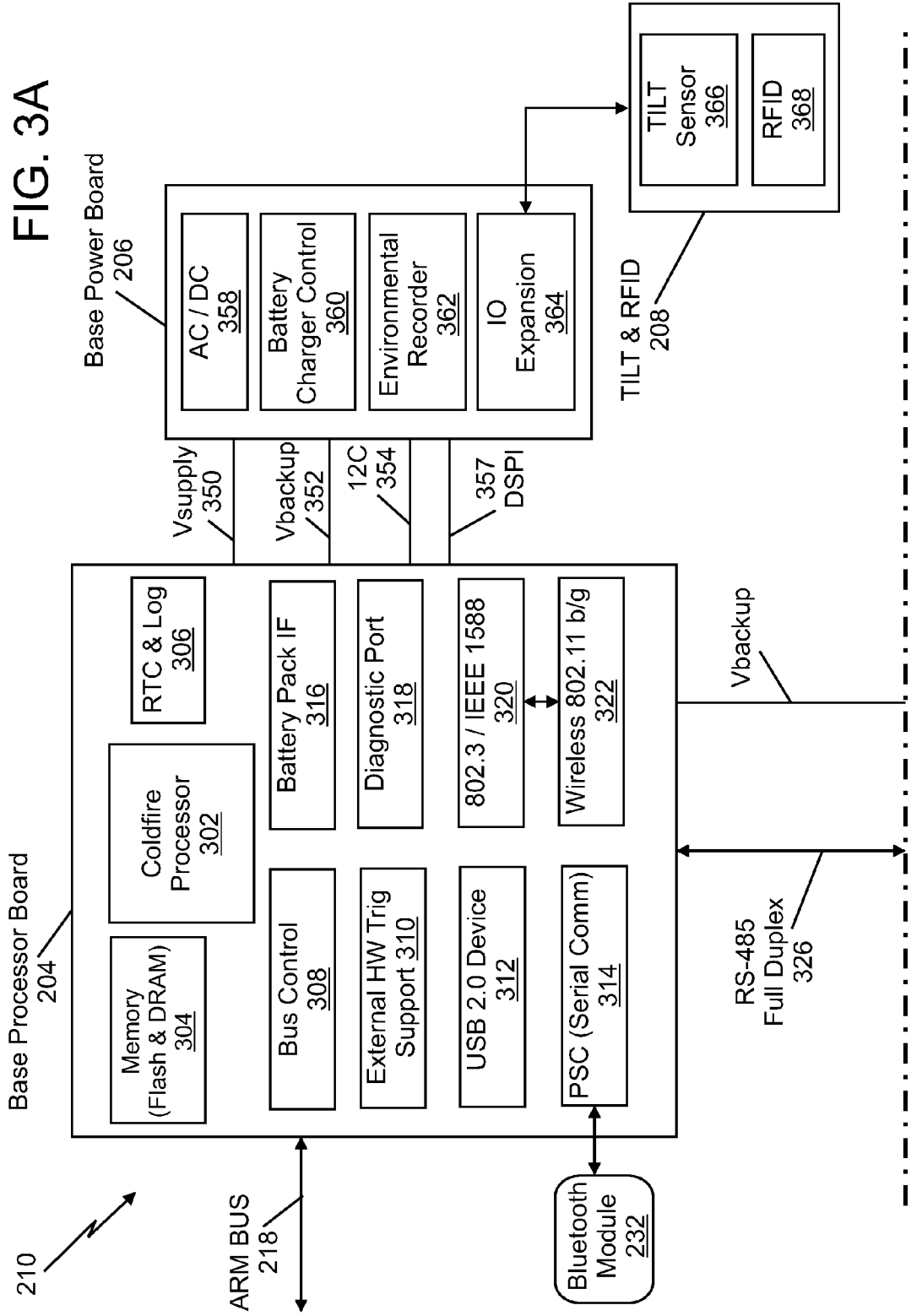

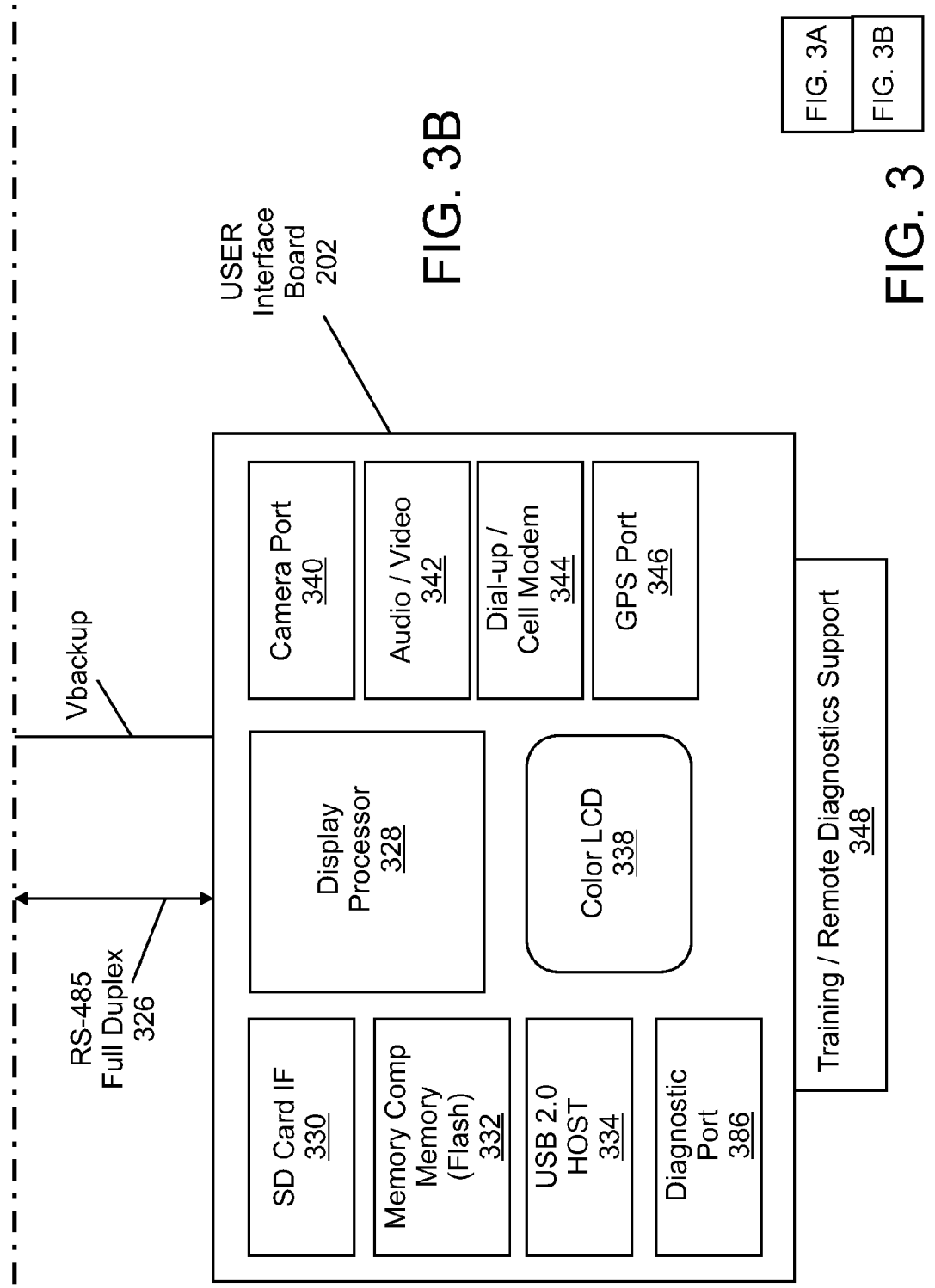

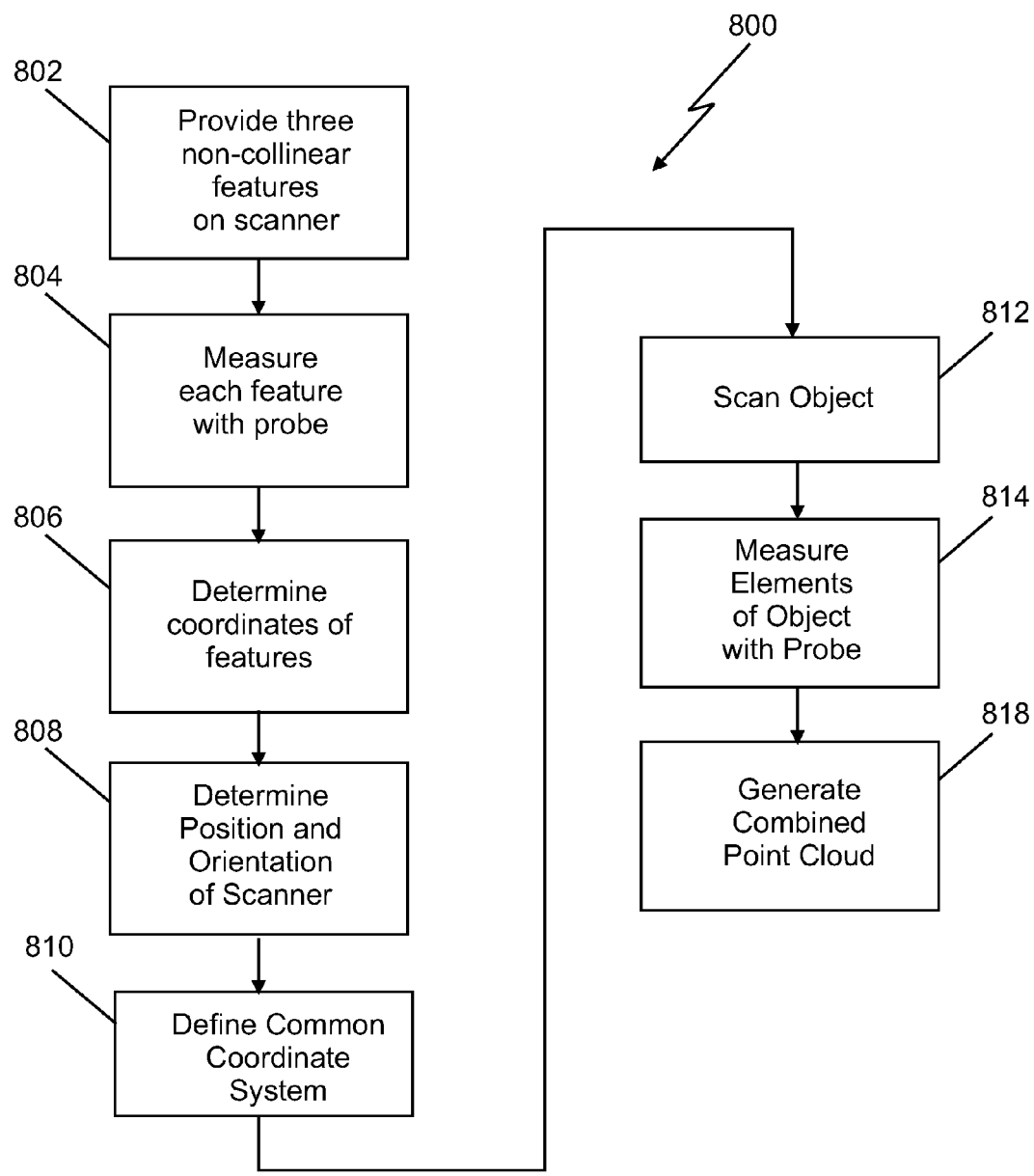

METHOD OF DETERMINING A COMMON COORDINATE SYSTEM FOR AN ARTICULATED ARM COORDINATE MEASUREMENT MACHINE AND A SCANNER

CROSS REFERENCE TO RELATED APPLICATIONS

The present application is a nonprovisional application of U.S. Provisional Patent Application Ser. No. 61/786,713 entitled "Method of Determining a Common Coordinate System for an Articulated Arm Coordinate Measurement Machine and a Scanner" filed 15 Mar. 2013, the contents of which is incorporated by reference.

BACKGROUND OF THE INVENTION

The subject matter disclosed herein relates to a method of determining a common coordinate system for a plurality of coordinate measurement devices and in particular to a method of determining a common coordinate system between a portable articulated arm coordinate measurement machine (AACMM) and a scanner.

A coordinate measurement device is a device that may be used by an operator to measure and electronically capture coordinates of points on a surface. There are several different types of coordinate measurement devices, such as but not limited to: an AACMM, a laser line probe, a laser tracker and an optical structured light scanner for example. The coordinates of the measured points are determined relative to a local coordinate reference system of the measurement device. For example, the AACMM may have a local coordinate system positioned in the base of the device. The local coordinate reference system allows each of the measurements made by the measurement device to be taken relative to each other. The coordinate reference system may be made during post processing.

It should be appreciated that it is difficult to use different types of coordinate measurement devices together to measure a single object or environment since each device acquires the coordinate data in a different coordinate frame. Further complicating this problem is that different types of coordinate measurement machines use different techniques for calibration and registration. For example, optical systems may use circular adhesive photogrammetry labels for registration. However, it would be difficult for an AACMM with a contact-type probe to measure these labels with a desired level of accuracy.

Accordingly, while existing systems for measuring coordinates of points on a surface are suitable for their intended purposes the need for improvement remains, particularly in providing a common coordinate reference frame for a pair of coordinate measurement devices that are operated independent of each other to measure an object.

BRIEF DESCRIPTION OF THE INVENTION

According to one aspect of the invention, a method of determining a mathematical transformation to place three-dimensional (3D) coordinates of points measured by an articulated arm coordinate measurement machine (AACMM) and 3D points measured by a scanner in a common coordinate system is provided. The method comprising: providing the AACMM having a manually positionable arm portion having an opposed first end and second end, the first end attached to a base, the arm portion including a plurality of connected arm segments, each arm segment including at least one position transducer for producing a position signal, the second end having a probe end with a probe arranged thereon, the AACMM having a first controller configured to determine a 3D coordinate of the probe in response to the position signals, the AACMM having a AACMM coordinate system fixed with respect to the base; providing the scanner having a light projector and at least one camera, the light projector and the at least one camera arranged in a fixed geometric relationship, the light projector configured to project a structured light pattern, the scanner having a second controller configured to determine 3D coordinates in response to receiving the structured light pattern with the at least one camera, the scanner having a scanner coordinate system fixed with respect to the base; arranging three targets proximate an object to be measured, the three targets each having a reference point, the three reference points being non-collinear; measuring with the probe a first plurality of 3D coordinates of each of three targets; determining, for each of the three targets, 3D probe reference coordinates, the probe reference coordinates being 3D coordinates of the reference point of the target based at least in part on the first plurality of measured 3D coordinates of the target; measuring with the scanner a second plurality of 3D coordinates of each of three targets; determining, for each of the three targets, 3D scanner reference coordinates, the 3D scanner reference coordinates being 3D coordinates of the reference point of the target based at least in part on the second plurality of measured 3D coordinates of the target; determining the mathematical transformation based at least in part on the 3D probe reference coordinates and the 3D scanner reference coordinates, the mathematical transformation characterized at least in part by a collection of parameters; and storing the collection of parameters.

In accordance with another aspect of the invention, another method of determining a mathematical transformation to place three-dimensional (3D) coordinates of points measured by an articulated arm coordinate measurement machine (AACMM) and 3D points measured by a scanner in a common coordinate system is provided. The method comprising: providing the AACMM having a manually positionable arm portion having an opposed first end and second end, the first end attached to a base, the arm portion including a plurality of connected arm segments, each arm segment including at least one position transducer for producing a position signal, the second end having a probe end with a probe arranged thereon, the AACMM having a first controller configured to determine a 3D coordinate of the probe in response to the position signals, the AACMM having a AACMM coordinate system fixed with respect to the base; providing the scanner having a light projector and a camera, the light projector and the camera arranged in a fixed geometric relationship, the light projector configured to project a structured light pattern, the scanner having a second controller configured to determine 3D coordinates in response to receiving the structured light pattern with the at least one camera, the scanner having a scanner coordinate system fixed with respect to the base, the scanner including three targets, each target having a reference point fixed with respect to the camera and the projector, the three reference points being non-collinear, the three reference points having a first geometric relationship with respect to the camera and the projector; measuring with the probe a first plurality of 3D coordinates of each of three targets; determining, for each of the three targets, 3D probe reference coordinates, the probe reference coordinates being 3D coordinates of the reference point of the target based at least in part on the first plurality of measured 3D coordinates of the target; determining the mathematical transformation based at least in part on the 3D probe reference coordinates and the first geometric relationship, the mathematical transformation characterized at least in part by a collection of parameters; and storing the collection of parameters.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1, including

FIG. 3, including FIGS. 3A and 3B taken together, is a block diagram describing detailed features of the electronic data processing system of FIG. 2 in accordance with an embodiment;

FIG. 10 is a flow diagram illustrating a process for determining a common coordinate reference frame in accordance with the embodiment of FIG. 8.

The detailed description explains embodiments of the invention, together with advantages and features, by way of example with reference to the drawings.

DETAILED DESCRIPTION OF THE INVENTION

Embodiments of the present invention provide advantages in allowing a first coordinate measurement device having a contact-type probe to be used in combination with a second coordinate measurement device that optically measures an object. Embodiments provide advantages in defining a common coordinate reference frame for both the first coordinate measurement device and the second coordinate measurement device that allows each of the devices to measure the object independent of the other while allowing the measurement data to be combined.

Figure 1A:
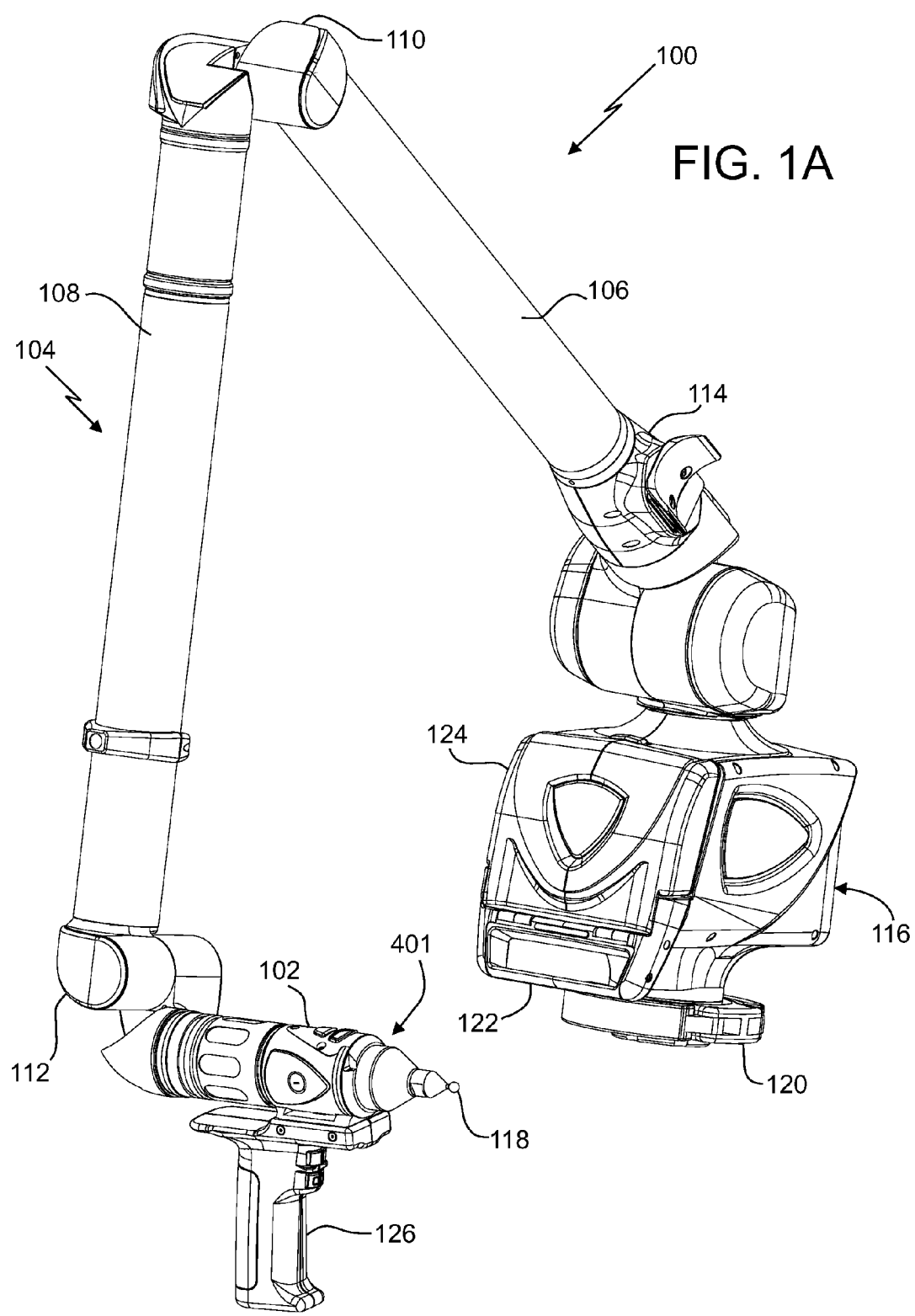
FIGS. 1A and 1B, are perspective views of a portable articulated arm coordinate measuring machine (AACMM) having embodiments of various aspects of the present invention therewithin.
Figure 1B:
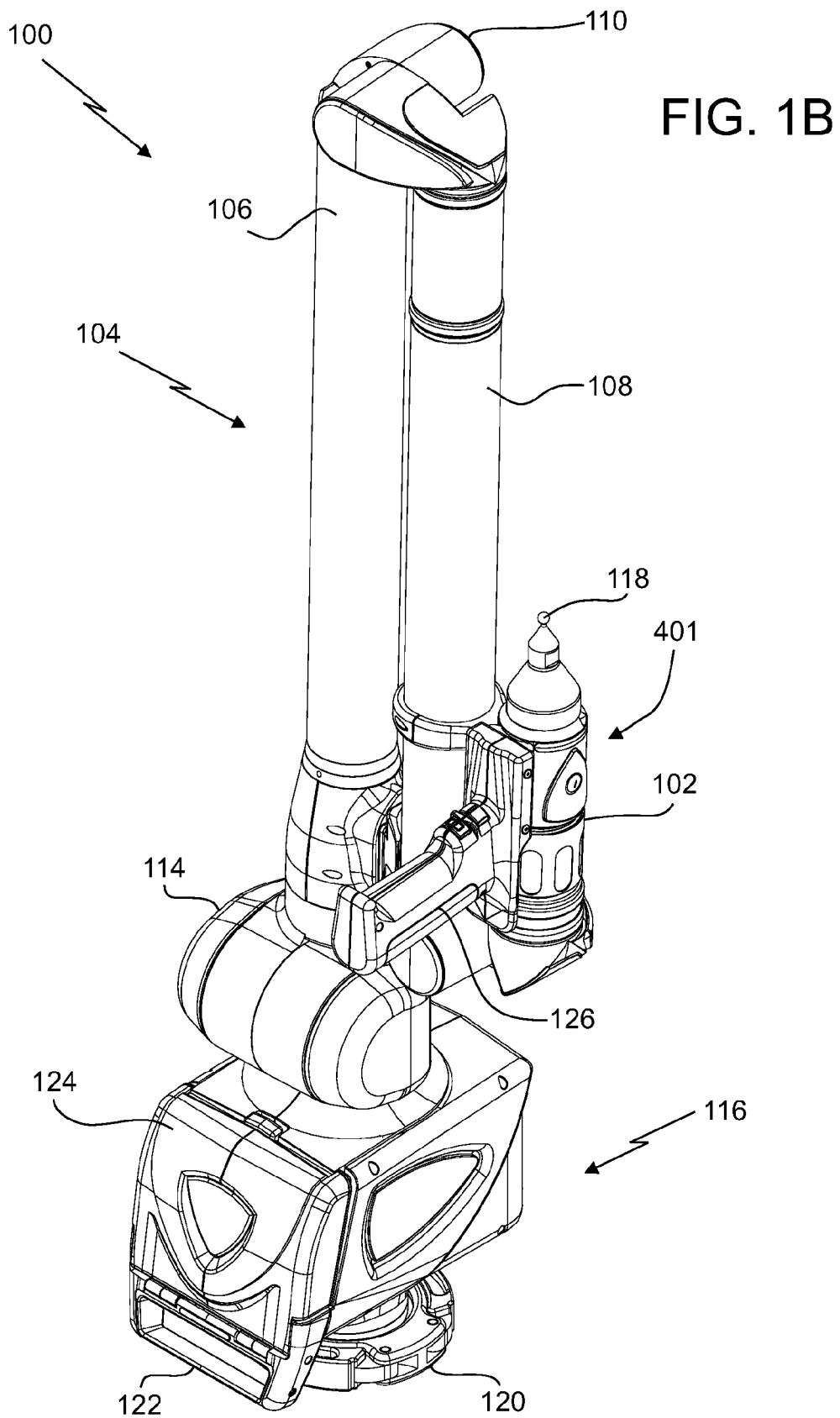

FIGS. 1A and 1B illustrate, in perspective, an AACMM 100 according to various embodiments of the present invention, an articulated arm being one type of coordinate measuring device. As shown in FIGS. 1A and 1B, the exemplary AACMM 100 may comprise a six or seven axis articulated measurement device having a probe end 401 (FIG. 4) that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of an axis of rotation for the AACMM 100 (e.g., a cartridge containing an encoder system that determines movement of the measurement device, for example a probe 118, in an axis of rotation for the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device configured to provide non-contact distance measurement of an object, thereby providing advantages in allowing the operator to make both contact and non-contact measurements with the same AACMM 100. In exemplary embodiments, the probe 118 is a contacting measurement device and is removable. The probe 118 may have different tips 118 that physically contact the object to be measured, including, but not limited to: ball, touch-sensitive, curved and extension type probes. In an embodiment, the handle 126 is replaced with the coded structured light scanner device. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

In one embodiment, the AACMM 100 includes the removable handle 126, such as that described in commonly owned U.S. Pat. No. 8,533,967 which is incorporated herein by reference. The removable handle 126 may provide advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 401.

In various embodiments, each grouping of bearing cartridges 110, 112, 114 allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a noncontact distance measurement device that can be mounted to the removable handle 126 on the AACMM 100). The electronics that support these peripheral hardware devices or features may be located in each of the bearing cartridge groupings 110, 112, 114 located within the portable AACMM 100.

Figure 2A:
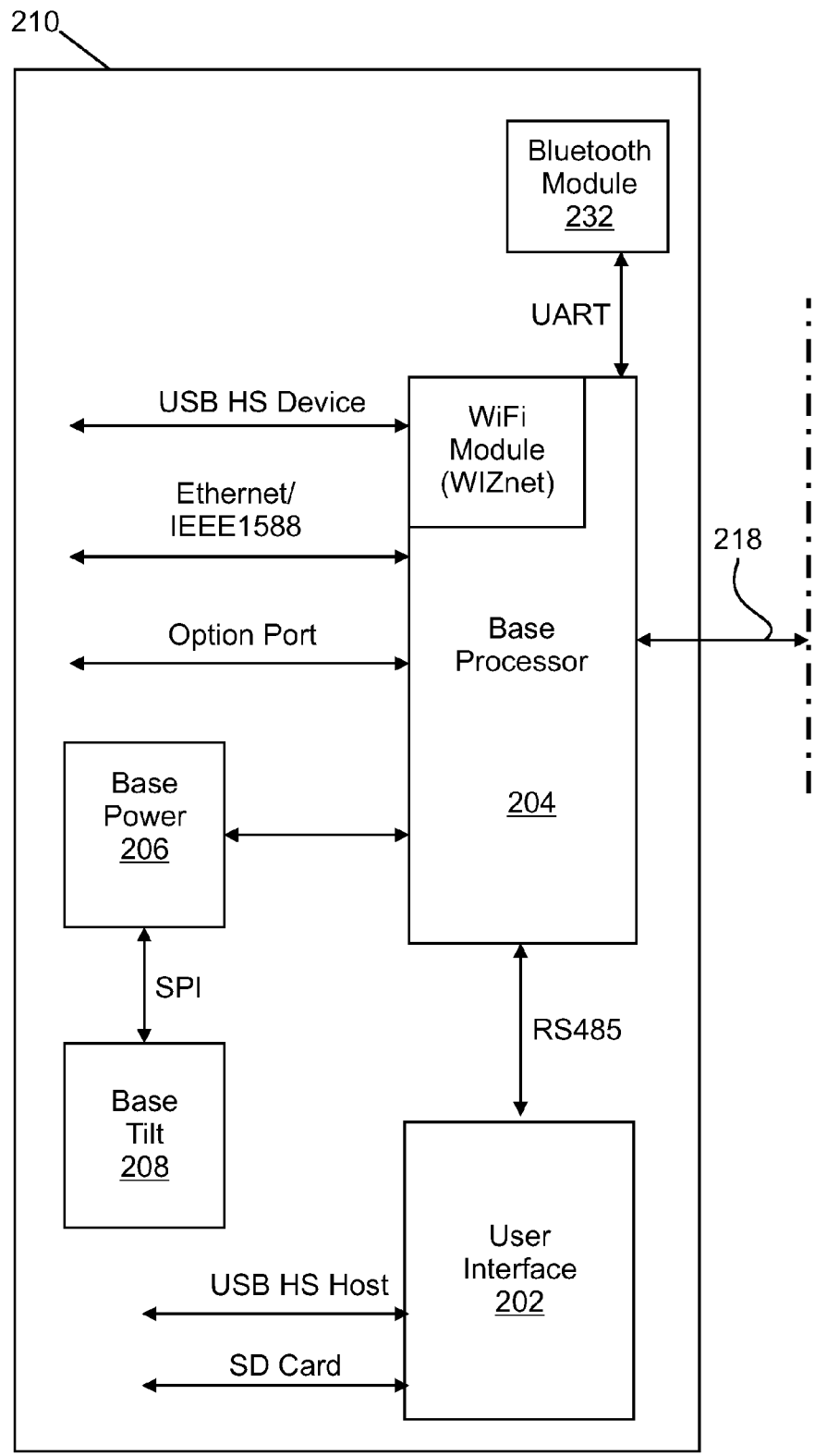
FIG. 2, including FIGS. 2A-2D taken together, is a block diagram of electronics utilized as part of the AACMM of FIG. 1 in accordance with an embodiment.
Figure 2B:
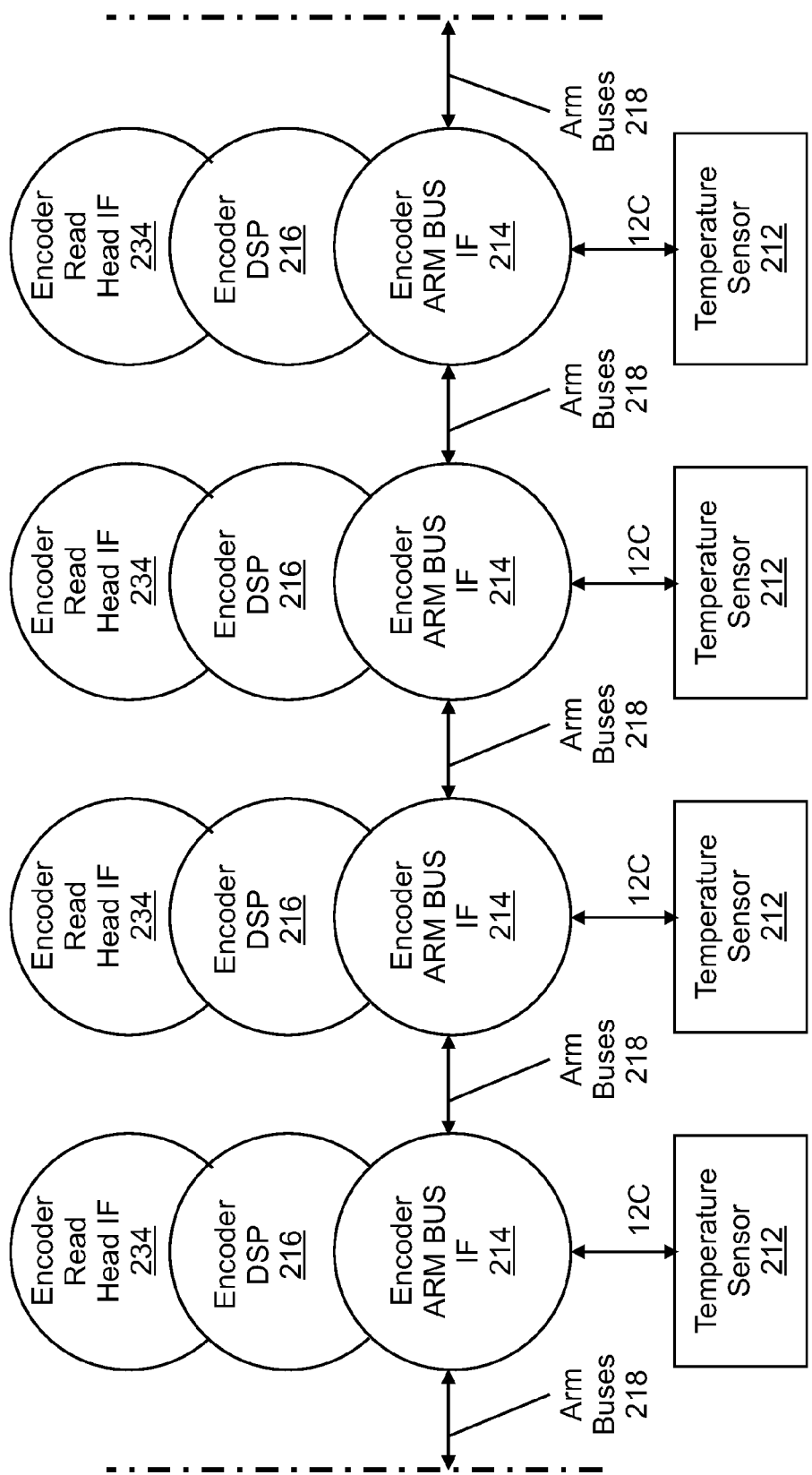
Figure 2C:
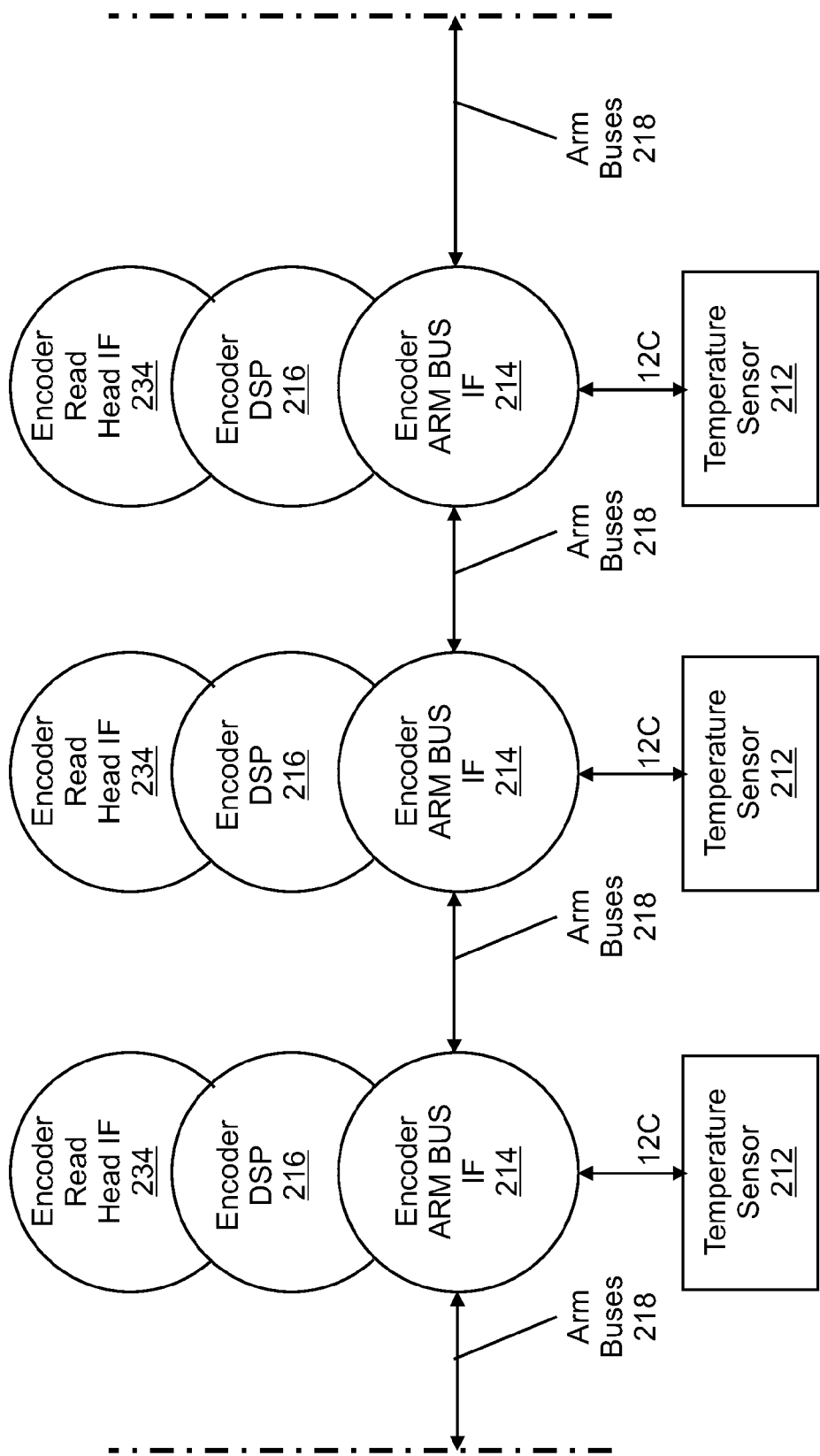
Figure 2D:
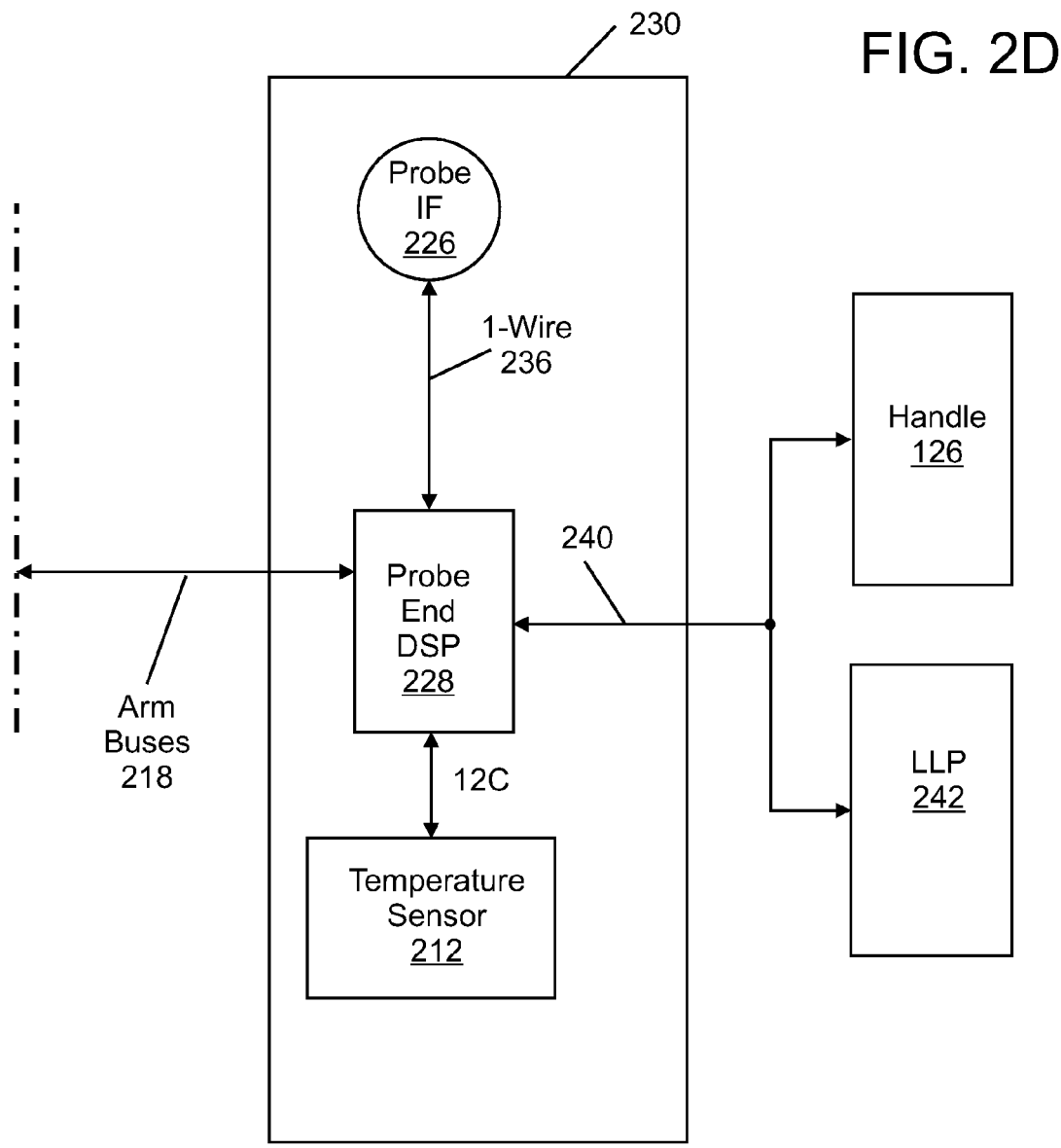
Figure 2:
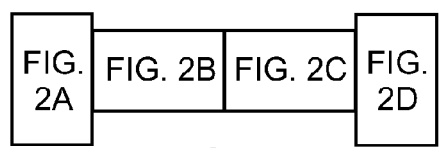

FIG. 2 is a block diagram of the electronic circuit utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2A, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the noncontact distance measurement device 242 via an interface, and a probe interface 226. The interface allows access by the handle 126 to the data bus, control lines, and power bus used by the noncontact distance measurement device 242 and other accessories. In an embodiment, the probe end electronics 230 are located in the measurement probe housing 102 on the AACMM 100. In an embodiment, the handle 126 may be removed from the interface and measurement may be performed by the noncontact distance measurement device 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3A is a block diagram describing features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as a noncontact distance measurement device 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
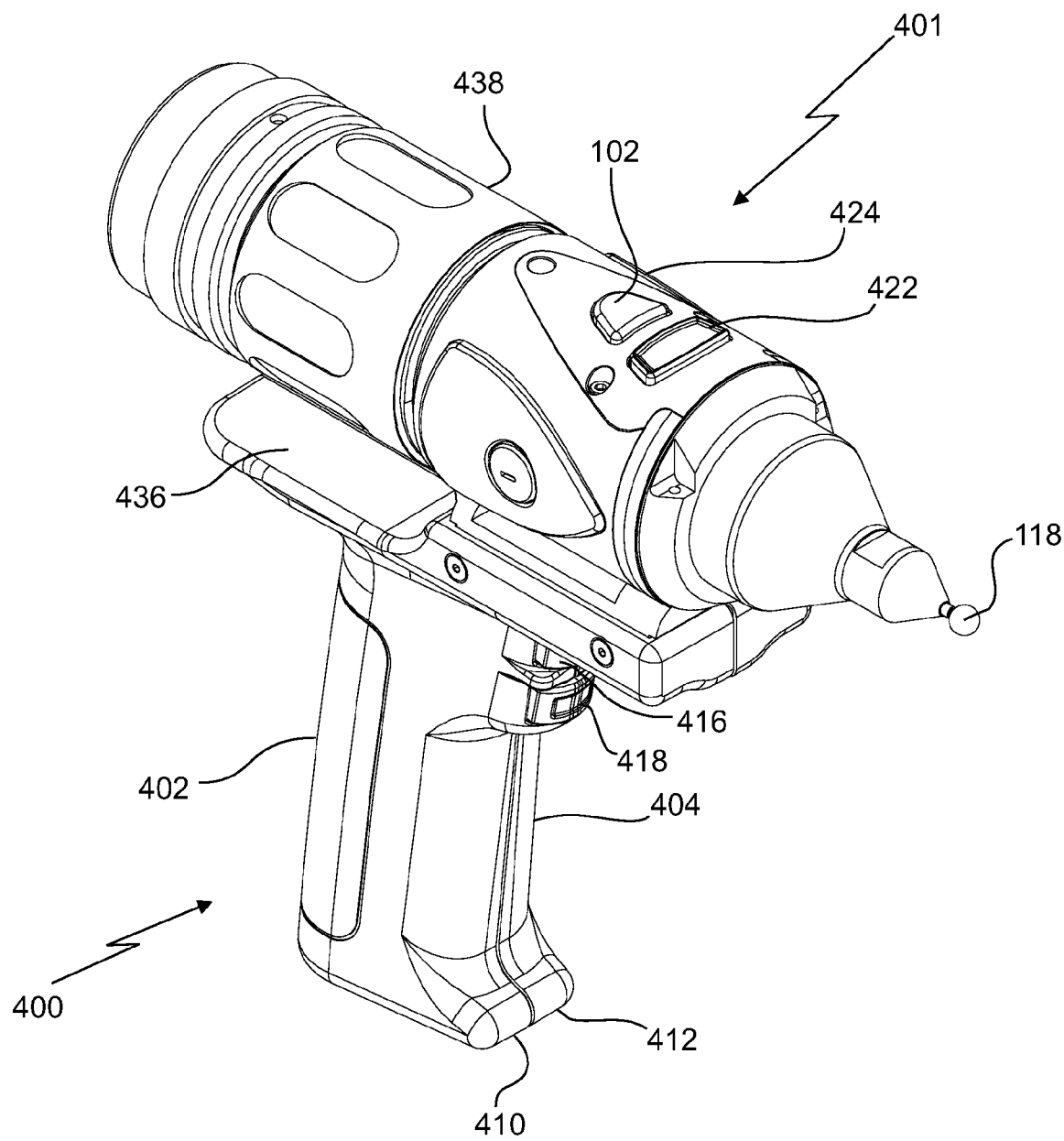
FIG. 4 is an isometric view of the probe end of the AACMM of FIG. 1.

Referring now to FIG. 4, an embodiment of a probe end 401 is illustrated having a measurement probe housing 102. The housing 102 may have a mechanical and electrical interface that allows removable and interchangeable device 400 to couple with AACMM 100. In one embodiment, the device 400 includes an enclosure 402 that includes a handle portion 404 that is sized and shaped to be held in an operator's hand, such as in a pistol grip for example. The enclosure 402 is a thin wall structure having a cavity. The cavity is sized and configured to receive a controller. The controller may be a digital circuit, having a microprocessor for example, or an analog circuit. In one embodiment, the controller is in asynchronous bidirectional communication with the electronic data processing system 210 (FIGS. 2 and 3). The communication connection between the controller and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves, such as from an injection molded plastic material for example. The halves may be secured together by fasteners, such as screws for example. In other embodiments, the enclosure halves may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

Figure 5:
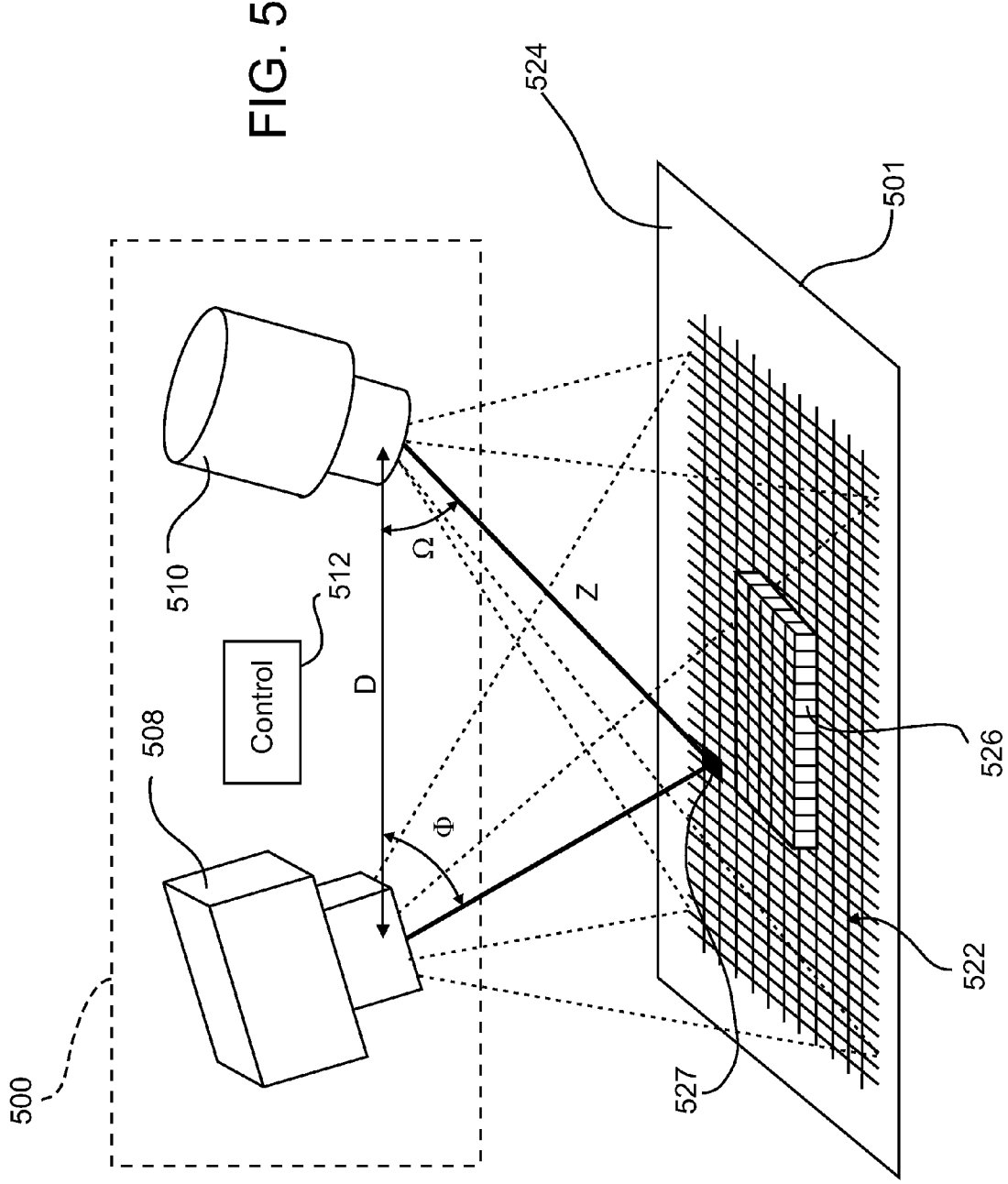
FIG. 5 and FIG. 6 are schematic views illustrating the operation of a scanner coordinate measurement device.
Figure 6:
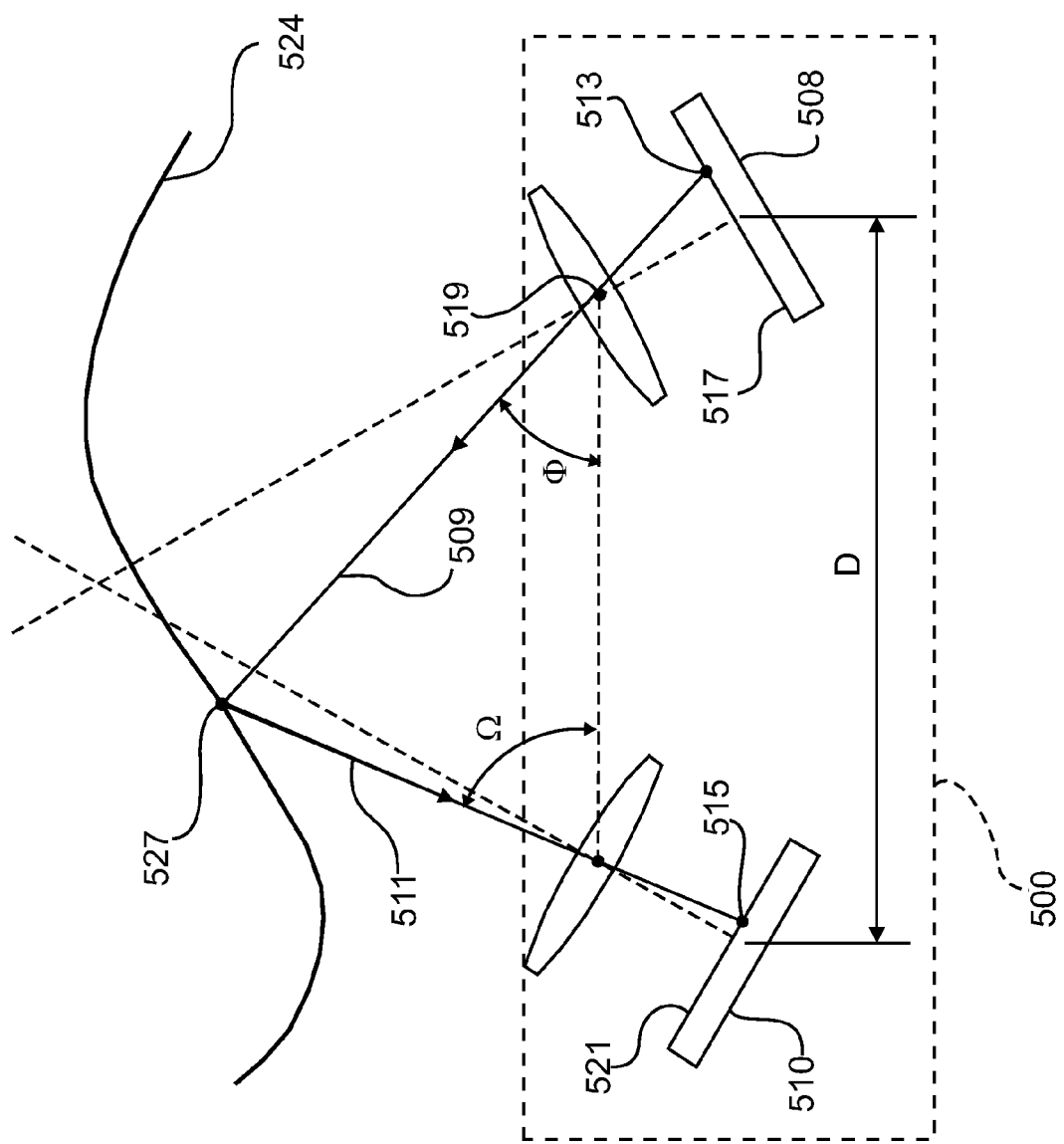

Referring now to FIG. 5 and FIG. 6, the operation of a second coordinate measurement device, such as the structured light device or scanner 500 will be described. The scanner 500 first emits a structured light pattern 522 with projector 508 onto surface 524 of an object 501. The structured light pattern 522 may include the patterns disclosed in the journal article "DLP-Based Structured Light 3D Imaging Technologies and Applications" by Jason Geng published in the Proceedings of SPIE, Vol. 7932, which is incorporated herein by reference. The light 509 from projector 508 is reflected from the surface 524 and the reflected light 511 is received by the camera 510. It should be appreciated that variations in the surface 524, such as protrusion 526 for example, create distortions in the structured pattern when the image of the pattern is captured by the camera 510. Since the pattern is formed by structured light, it is possible in some instances for a controller 512 to determine a one to one correspondence between the pixels in the emitted pattern, such as pixel 513, for example, and the pixels in the imaged pattern, such as pixel 515 for example. In one embodiment, the scanner 500 and the AACMM 100 are coupled for wireless or wired communication. In these embodiments, the electronic data processing system 210 may also be configured to determine the correspondence between the pixels.

In the exemplary embodiment, the controller 512 is a suitable electronic device capable of accepting data and instructions, and executing the instructions to process the data. Controller 512 may include a processor coupled to one or more components such as but not limited to a random access memory (RAM), non-volatile memory (NVM), read-only memory (ROM), one or more input/output (I/O) controllers, and LAN interface circuits. In general, controller 512 accepts data from camera 510 and is given certain instructions for the purpose of comparing the data from camera 510 to predetermined light pattern 522 to determine correspondence between the pixels of the camera 510 and the projector 508. Controller 512 provides operating signals to the camera 512 and the projector 508.

Determining the correspondence between pixels enables the controller 512 to use triangulation principals in determining the coordinates of each pixel in the imaged pattern. The collection of three-dimensional coordinates of the surface 524 is sometimes referred to as a point cloud. By moving the scanner 500 over the surface 524, a point cloud may be created of the entire object 501.

To determine the coordinates of the pixel, the angle of each projected ray of light 509 intersecting the object 522 in a point 527 is known to correspond to a projection angle phi (Φ), so that Φ information is encoded into the emitted pattern. In an embodiment, the system is configured to enable the Φ value corresponding to each pixel in the imaged pattern to be ascertained. Further, an angle omega (Ω) for each pixel in the camera is known, as is the baseline distance "D" between the projector 508 and the camera. Therefore, the distance "Z" from the camera 510 to the location that the pixel has imaged using the equation:

$$\frac{Z}{D} = \frac{\sin(\Phi)}{\sin(\Omega + \Phi)} \quad (1)$$

Thus three-dimensional coordinates may be calculated for each pixel in the acquired image.

In general, there are two categories of structured light, namely coded and uncoded structured light. A common form of uncoded structured light relies on a striped pattern varying in a periodic manner along one dimension. These types of patterns are usually applied in a sequence to provide an approximate distance to the object. Some uncoded pattern embodiments, such as the sinusoidal patterns for example, may provide relatively highly accurate measurements. However, for these types of patterns to be effective, it is usually necessary for the scanner device and the object to be held stationary relative to each other. In one embodiment, the scanner 500 may use an uncoded pattern where the object or scanner is not stationary. In this embodiment, the scanner 500 may be the type described in commonly owned U.S. patent application Ser. No. 13/767,167 entitled "Device for Optically Scanning and Measuring an Environment" filed on Feb. 14, 2013, the contents of which are incorporated by reference.

Where the scanner device or the object are in motion (relative to the other), then a coded pattern may be desired. A coded pattern allows the image to be analyzed using a single acquired image. Some coded patterns may be placed in a particular orientation on the projector pattern (for example, perpendicular to epipolar lines on the projector plane), thereby simplifying analysis of the three-dimensional surface coordinates based on a single image.

Epipolar lines are mathematical lines formed by the intersection of epipolar planes and the source plane 517 or the image plane 521 (the plane of the camera sensor) in FIG. 6. An epipolar plane may be any plane that passes through the projector perspective center 519 and the camera perspective center. The epipolar lines on the source plane 517 and the image plane 521 may be parallel in some cases, but in general are not parallel. An aspect of epipolar lines is that a given epipolar line on the projector plane 517 has a corresponding epipolar line on the image plane 521. Therefore, any particular pattern known on an epipolar line in the projector plane 517 may be immediately observed and evaluated in the image plane 521. For example, if a coded pattern is placed along an epipolar line in the projector plane 517, the spacing between the coded elements in the image plane 521 may be determined using the values read out of the pixels of the camera sensor 510. This information may be used to determine the three-dimensional coordinates of a point 527 on the object 501. It is further possible to tilt coded patterns at a known angle with respect to an epipolar line and efficiently extract object surface coordinates.

In embodiments having a periodic pattern, such as a sinusoidally repeating pattern, the sinusoidal period represents a plurality of pattern elements. Since there is a multiplicity of periodic patterns in two-dimensions, the pattern elements are non-collinear. In some cases, a striped pattern having stripes of varying width may represent a coded pattern.

Figure 7:
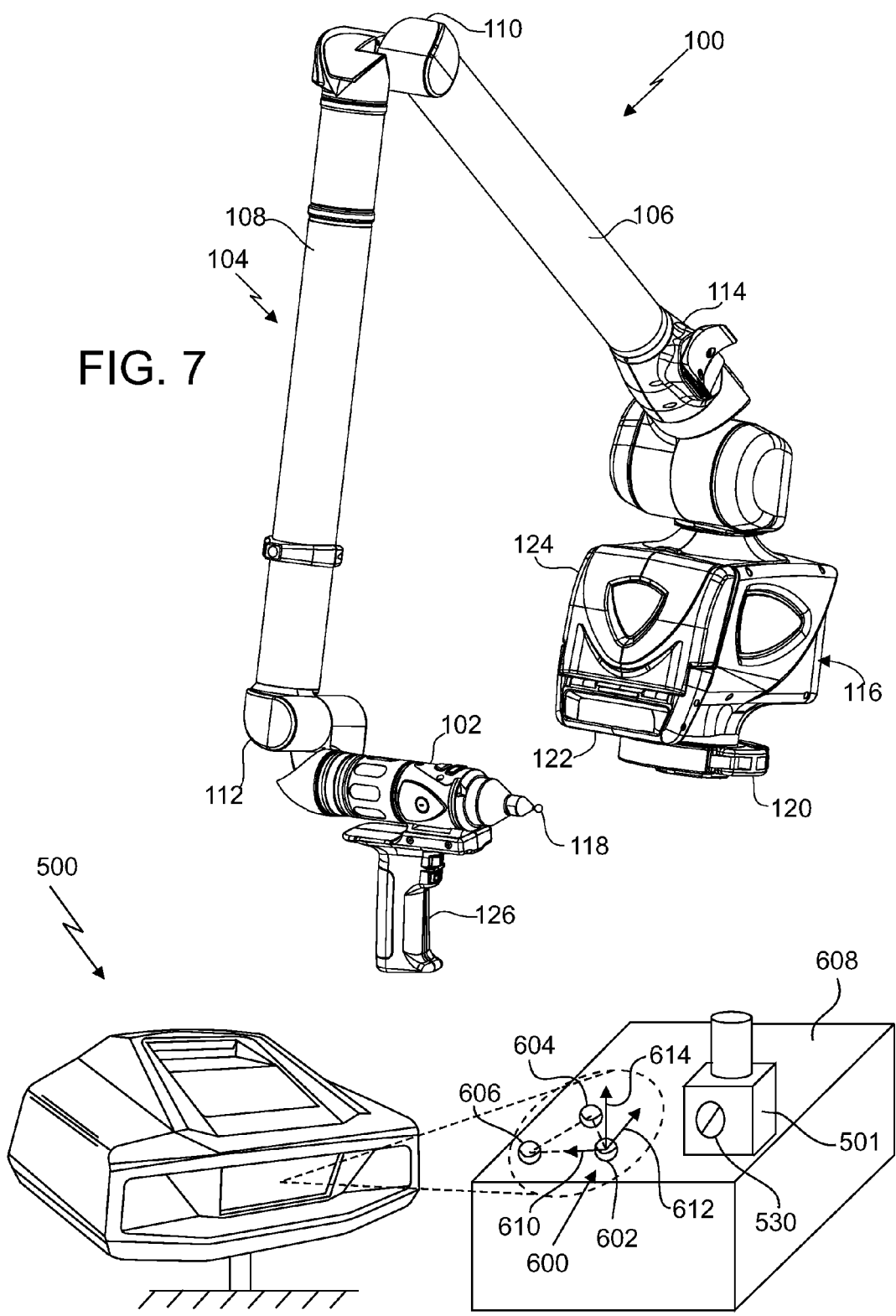
FIG. 7 is a perspective view illustrating the measurement of an object using an AACMM and a scanner in combination in accordance with an embodiment of the invention.
Figure 8:
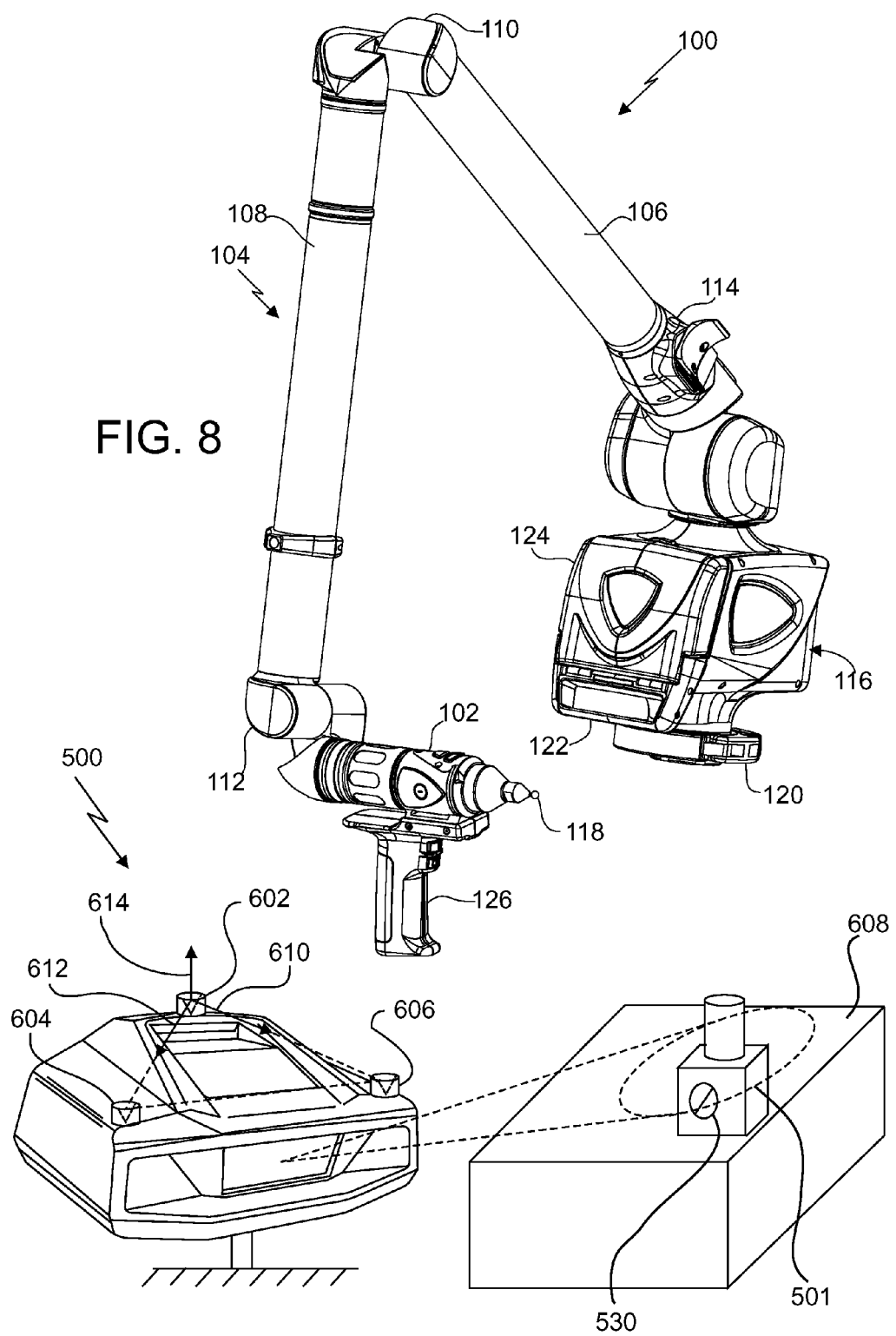
FIG. 8 is a perspective view illustrating the measurement of an object using an AACMM and a scanner in combination in accordance with another embodiment of the invention.

In some embodiments, such as those shown in FIGS. 7-8, it may be desirable to use both an AACMM and a structured light scanner to measure an object. Using both types of coordinate measuring devices provide advantages in acquiring coordinate data. The scanner 500 provides a rapid means for acquiring a large number of points on the surfaces of the object 501. However, a scanner 500 may not provide the level of desired resolution to measure certain features such as the diameter or cylindricity of hole 503 for example. For these features, the probe 118 of AACMM 100 may be used to acquire data on the feature such as hole 530 for example with a high level of accuracy.

It should be appreciated that while both the AACMM 100 and the scanner 500 acquire coordinate data of points of surfaces of the object 501, these coordinates are acquired in a local coordinate frame that is particular to that device. It may be relatively inaccurate and time consuming to match these data sets during post processing unless a common coordinate reference frame is established.

Figure 9:
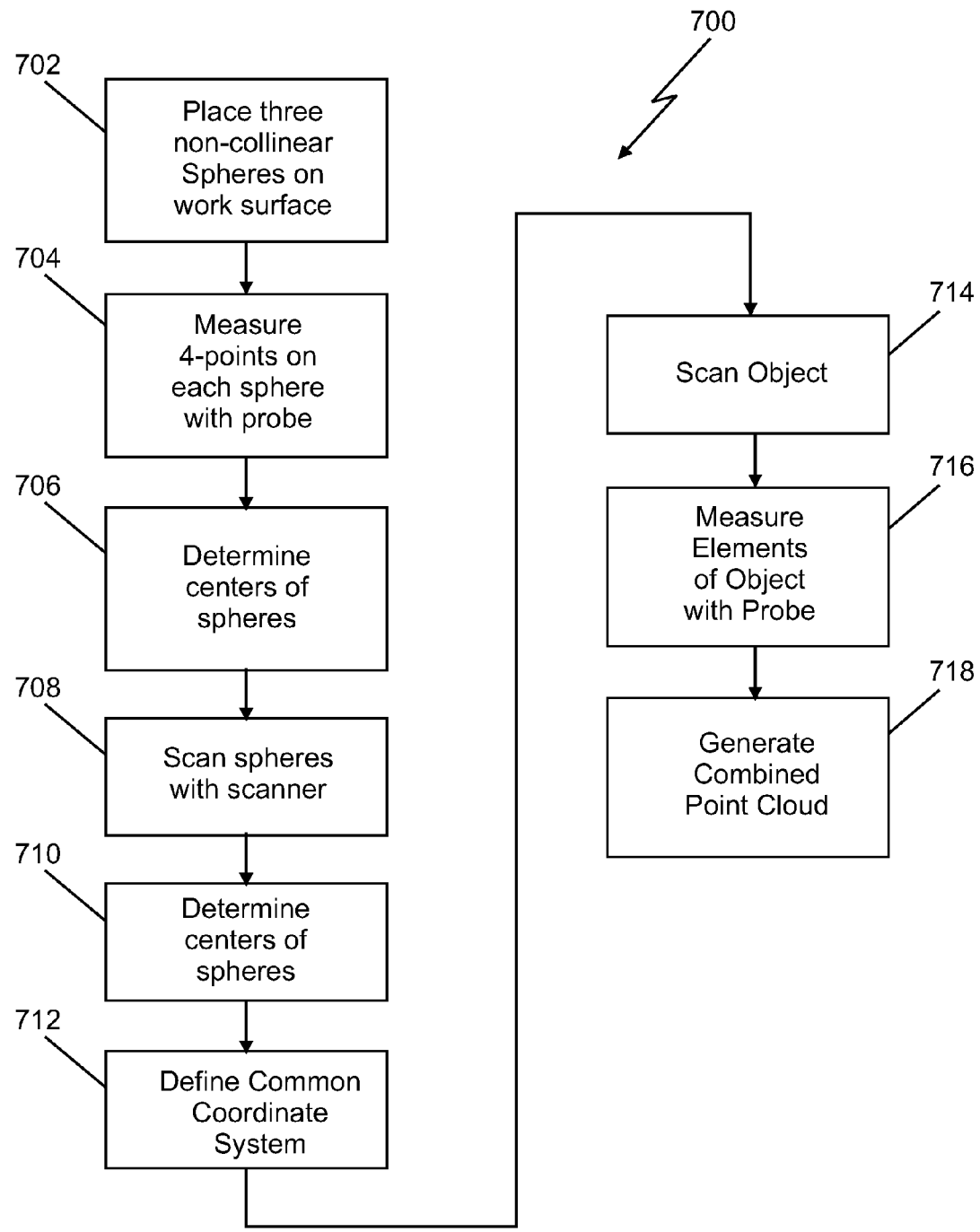
FIG. 9 is a flow diagram illustrating a process for determining a common coordinate reference frame in accordance with the embodiment of FIG. 7.

Referring now to FIG. 7 and FIG. 9, a method is shown for determining a common coordinate reference frame 600 that facilitates the acquisition of coordinates of points on the surfaces of object 501 with AACMM 100 and the scanner 500. In this embodiment, the scanner 500 is portable, either movable by the operator by hand, or mounted to a movable fixture such as a robotic apparatus for example. The AACMM 100 is typically mounted in a fixed location, however as will be discussed in more detail below, if the AACMM 100 is moved the reference to the common coordinate reference frame 600 may be reacquired.

In one embodiment, in the block 501, the operator places at least three measurement features 602, 604, 606 on a work surface 608 holding an object 501. The measurement features 602, 604, 606 are disposed in a non-collinear arrangement relative to each other. In another embodiment, the operator places the measurement features 602, 604, 606 on the object 501. These measurement features 602, 604, 606 may be attached to the surface 608, object 501, or a combination of the surface 608 and the object 501 such that they will stay in place for the duration of the measurements. The measurement features 602, 604, 606 are placed in a position such that they may be measured by both the AACMM 100 and the scanner 500. In the exemplary embodiment, the measurement features 602, 604, 606 each have a spherical or semi-spherical surface.

Next the operator measures each of the spherical surfaces of the measurement features 602, 604, 606 with the probe 118 of AACMM 100 in block 704. In one embodiment, this measurement step involves contacting the probe 118 with each spherical surface in four places, such as once on the end (i.e. an area opposite the surface 508) and three times about the circumference. The measurement of each spherical surface allows the AACMM 100 to determine the centers of each spherical surface in block 706. If desired, additional points on each sphere may be measured with the AACMM 100 to improve the accuracy of the measured centers.

The scanner 500 is then operated in block 708 and projects a structured light onto the work surface 608 and the spherical surfaces of the measurement features 602, 604, 606. The structured light is reflected from the spherical surfaces and received by the camera 510. As discussed above, the scanner 500 may then determine a correspondence between the pixels using triangulation principles. This allows the scanner 500 to determine the coordinates of points on the spherical surfaces. With the coordinate data, the scanner 500 calculates a center for each of the spherical surfaces of the measurement features 602, 604, 606 in block 710.

The method 700 then proceeds to block 712 where the common coordinate reference frame 600 is determined based on the positions of the centers of the spherical surfaces determined by the AACMM 100 and scanner 500. In the exemplary embodiment, where the determined centers of the spherical surfaces are co-located, a direction 610 between two measurement features, such as features 602, 606 for example, is defined as the X-axis (for a Cartesian coordinate system). The Y-axis 612 would then be defined as being perpendicular to the X-axis 610 and lying on a plane defined by the three centers of the measurement features 602, 604, 606. The Z-axis 614 is subsequently defined as being perpendicular to both the X-axis 610 and the Y-axis 612. It should be appreciated that other methods of defining the common coordinate reference frame may be utilized and other coordinate frames (e.g. cylindrical coordinate systems or spherical coordinate systems) may be used.

In still another embodiment, the measurement features 602, 604, 606 may be integrated into the object 501 or the work surface 608. These measurement features could be measured by the AACMM 100 with a single measurement with the probe 118 and also established using scanner 500. In one embodiment, these measurement features may be in the form of a trihedral recess consisting of three perpendicular surfaces, much as in a cube corner retroreflector. Then, by probing at the intersection of the three surfaces with the probe 118 and measuring the three surfaces with the scanner 500, a common coordinate reference frame could be established.

It should be appreciated that there is some error in co-locating the centers of the targets 602, 604, 606 due to measurement errors in the AACMM 100 and the scanner 500. In one embodiment, a least-squares procedure is used to determine the position of the centers so as to reduce or minimize the sum of squared residual errors (where the residual errors are the distances between the collection of three-dimensional coordinates as measured by the two instruments (AACMM and scanner) after the coordinates have been transformed into the common frame of reference. Improvements in accuracy are possible by increasing the number of points measured on each target (for example, spherical target) or by increasing the number of targets. With this method, the common frame of reference may be the frame of reference of the AACMM, the scanner, or any other desired frame of reference.

In another embodiment, the positions of the spherical surfaces may be known through measurements by a third coordinate measurement device having a relatively high accuracy relative to the AACMM 100 and scanner 500, such as with a Cartesian CMM or a laser tracker device for example. In this embodiment, the sum of squared residual errors would include the residual errors for both the scanner 500 and AACMM 100. This embodiment may include a weighting factor in which the squared residual errors are weighted more heavily for the coordinate measurement device with less accuracy. If the scanner 500 is less accurate than the AACMM 100, then the squared residual errors of the scanner 500 could be weighted more heavily in the sum of squared residual errors. As a result, the final positions of the centers of the spherical surfaces would be more heavily influenced by the articulated arm measurements.

Once the common coordinate reference frame 600 has been defined, process 700 proceeds to block 714 where the object 501 is scanned using the scanner 500. Coordinate data for points on the surfaces of the object 501 may be determined by the scanner 500. If the scanner 500 acquires multiple frames of scan data, such as when the scanner 500 is moved about the object 501, the successive images may be matched using a videogrammetry technique. In another embodiment, the successive images may be matched using reference points, such as the measurement features 602, 604, 606, with photogrammetric labels placed on the surface 508 or object 501, with inertial sensors or via projected light spots. Where projected light spots are used, the scanner may match successive images using the process described in the aforementioned U.S. patent application Ser. No. 13/767,167. It should be appreciated that the coordinates obtained by the scanner 500 in block 714 may be determined in the common coordinate reference frame 600.

The process 700 then proceeds to acquire data using the AACMM 100 in block 716. It may be desirable to obtain data with the AACMM 100 to obtain measurements of features such as the diameter, depth or cylindricity of hole 530 for example. Further, the AACMM 100 may also be used to measure sharp edges or to eliminate scanning issues due to multipath interference or reflectance (high or low) for example. It should be appreciated that the AACMM 100 may determine the measurements in the common coordinate reference frame 600.

With the measurements completed by both the scanner 500 and the AACMM 100 in the same common coordinate reference frame 600, the data from the scanner 500 and the AACMM 100 may be combined together in block 718.

Referring to FIG. 8 and FIG. 10 a method 800 is shown for determining the common coordinate reference frame 600 with the measurement features 602, 604, 606 are attached or integrated into the scanner 500. In this embodiment, the measurement features 602, 604, 606 may be a kinematic nest having three contact points. In another embodiment, the measurement features 602, 604, 606 may be a conical nest having a recess with a conical surface that is sized to receive the probe 118 or a spherical surface. The measurement features are configured to allow consistent and repeatable measurement by a probe 118. The measurement features 602, 604, 606 are disposed on scanner 500 in a non-collinear arrangement in block 802.

Each of the measurement features 602, 604, 606 are measured by the AACMM 100 using the probe 118 in block 804. From these measurements, the AACMM 100 determines the coordinates of the measurement features 602, 604, 606 in block 806. Since the geometry (e.g. shape and size) of the scanner 500 is known, the position and orientation of the scanner 500 may be determined in block 808. With this data a common coordinate reference frame may be determined in block 810. In one embodiment, the common coordinate reference frame 600 is defined by the measurement features 602, 604, 606 as discussed above, with a first direction 612 being defined as the X-axis, the Y-Axis 614 being perpendicular to the X-axis in the plane defined by the measurement features 602, 604, 606. The Z-axis 616 is defined as perpendicular to the X-axis 612, and Y-axis 614.

In another embodiment, since the geometry of the scanner 500 is known, the common coordinate reference frame is defined as the natural coordinate reference frame of the scanner 500. This may provide advantages in reducing computational requirements and increase speed since the scanner 500 would not need to translate the coordinates from the acquired points on the object 501 into another coordinate reference frame. It should be appreciated that since the scanner 500 either directly defines the common reference coordinate frame, the scanner 500 should remain substantially fixed in a location for the duration of the measurements by both the AACMM 100 and the scanner 500. It should further be appreciated that if the AACMM 100 is moved to a different location, such as to measure the opposite side of the object 501 from the scanner 500 for example, the registration of the AACMM 100 to the measurement features 602, 604, 606 would need to be performed again.

With the common coordinate reference frame defined, the process 800 proceeds to block 812 where the scanner 500 is used to scan the object 501. Features, such as hole 530 may then be measured in block 814 and the measurements of the scanner 500 and AACMM 100 combined in block 816.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining a mathematical transformation to place three-dimensional (3D) coordinates of points measured by an articulated arm coordinate measurement machine (AACMM) and 3D points measured by a scanner in a common coordinate system, the method comprising:
    providing the AACMM having a manually positionable arm portion having an opposed first end and second end, the first end attached to a base, the arm portion including a plurality of connected arm segments, each arm segment including at least one position transducer for producing a position signal, the second end having a probe end with a probe arranged thereon, the AACMM having a first controller configured to determine a 3D coordinate of the probe in response to the position signals, the AACMM having a AACMM coordinate system fixed with respect to the base;
    providing the scanner having a light projector and at least one camera, the light projector and the at least one camera arranged in a fixed geometric relationship, the light projector configured to project a structured light pattern, the scanner having a second controller configured to determine 3D coordinates in response to receiving the structured light pattern with the at least one camera, the scanner having a scanner coordinate system fixed with respect to the base;
    arranging three targets proximate an object to be measured, the three targets each having a reference point, the three reference points being non-collinear;
    measuring with the probe a first plurality of 3D coordinates of each of three targets;
    determining, for each of the three targets, 3D probe reference coordinates, the probe reference coordinates being 3D coordinates of the reference point of the target based at least in part on the first plurality of measured 3D coordinates of the target, wherein the reference point of the target is the center of the target;
    measuring with the scanner a second plurality of 3D coordinates of each of three targets;
    determining, for each of the three targets, 3D scanner reference coordinates, the 3D scanner reference coordinates being 3D coordinates of the reference point of the target based at least in part on the second plurality of measured 3D coordinates of the target;
    determining the mathematical transformation based at least in part on the 3D probe reference coordinates and the 3D scanner reference coordinates, the mathematical transformation characterized at least in part by a collection of parameters, wherein the mathematical transformation includes a determination of the 3D transformed reference coordinates of the reference point using a least squares method where the residual errors are the distances between the 3D probe reference coordinates and the 3D scanner reference coordinates after transformation into a common frame of reference; and
    storing the collection of parameters.

2. The method of claim 1 wherein at least one of the three targets includes a spherical portion, the reference point of the at least one of the three targets being a center of the spherical portion.

3. The method of claim 1 wherein the three target are arranged on the object.

4. The method of claim 1 wherein the three target are arranged on a stationary work surface proximate the object.

5. The method of claim 1 wherein the step of measuring with the probe a first plurality of 3D coordinates of each of three targets includes measuring with the probe at least four points on each of the three targets.

6. The method of claim 1 wherein the step of measuring with the scanner a second plurality of 3D coordinates of each of the three targets includes measuring with the scanner at least four points on each of the three targets.

7. The method of claim 1 further comprising:
    providing a third coordinate measurement device, wherein the AACMM has a first accuracy level, the scanner has a second accuracy level and the third coordinate measurement device has a third accuracy level, the third accuracy level being higher than the first accuracy level and the second accuracy level;
    measuring with the third coordinate measurement device a third plurality of 3D coordinates of each of the three targets;
    determining for each of the three targets, 3D third reference coordinates, the third reference coordinates being 3D coordinates of the reference point of the target based at least in part on the third plurality of measured 3D coordinates of the target.

8. The method of claim 7 wherein:
    the step of determining the mathematical transformation is further based at least in part on the 3D third reference coordinates, and
    the determination of the 3D transformed reference coordinates by the least squares method includes a weighting factor in which the squared residual errors are weighted more for one of the AACMM, the scanner and the third coordinate measurement device.

9. A method of determining a mathematical transformation to place three-dimensional (3D) coordinates of points measured by an articulated arm coordinate measurement machine (AACMM) and 3D points measured by a scanner in a common coordinate system, the method comprising:
    providing the AACMM having a manually positionable arm portion having an opposed first end and second end, the first end attached to a base, the arm portion including a plurality of connected arm segments, each arm segment including at least one position transducer for producing a position signal, the second end having a probe end with a probe arranged thereon, the AACMM having a first controller configured to determine a 3D coordinate of the probe in response to the position signals, the AACMM having a AACMM coordinate system fixed with respect to the base;

providing the scanner having a light projector and a camera, the light projector and the camera arranged in a fixed geometric relationship, the light projector configured to project a structured light pattern, the scanner having a second controller configured to determine 3D coordinates in response to receiving the structured light pattern with the at least one camera, the scanner having a scanner coordinate system fixed with respect to the base, the scanner including three targets, each target having a reference point fixed with respect to the camera and the projector, the three reference points being non-collinear, the three reference points having a first geometric relationship with respect to the camera and the projector;

measuring with the probe a first plurality of 3D coordinates of each of three targets;

determining, for each of the three targets, 3D probe reference coordinates, the probe reference coordinates being 3D coordinates of the reference point of the target based at least in part on the first plurality of measured 3D coordinates of the target;

determining the mathematical transformation based at least in part on the 3D probe reference coordinates and the first geometric relationship, the mathematical transformation characterized at least in part by a collection of parameters, wherein the mathematical transformation includes a determination of the reference point of the target using a least squares method where the residual errors are the distances between the 3D probe reference coordinates and the 3D scanner reference coordinates after transformation into a common frame of reference; and storing the collection of parameters.

10. The method of claim 9 wherein each of the targets includes an opening having a conical surface.

11. The method of claim 9 wherein each of the targets includes a spherical portion and a corresponding reference point at the center of the spherical portion.

12. The method of claim 9 wherein the step of measuring with the probe a first plurality of 3D coordinates of each of the three targets includes measuring with the probe at least four points on each of the targets.

13. The method of claim 9 further comprising scanning an object with the scanner and determining 3D coordinates of a plurality of points on the surface of the object with the scanner, the 3D coordinates of the plurality of points given in the common coordinate system, the 3D coordinates based at least in part on the mathematical transformation.

14. The method of claim 9 further comprising:

providing a third coordinate measurement device, wherein the AACMM has a first accuracy level, the scanner has a second accuracy level and the third coordinate measurement device has a third accuracy level, the third accuracy level being higher than the first accuracy level and the second accuracy level;

measuring with the third coordinate measurement device a third plurality of 3D coordinates of each of the three targets;

determining for each of the three targets, 3D third reference coordinates, the third reference coordinates being 3D coordinates of the reference point of the target based at least in part on the third plurality of measured 3D coordinates of the target.

15. The method of claim 14 wherein:

the step of determining the mathematical transformation is further based at least in part on the 3D third reference coordinates, and the determination of the 3D transformed reference coordinates by the least squares method includes a weighting factor in which the squared residual errors are weighted more for one of the AACMM, the scanner and the third coordinate measurement device.

* * * * *